(12) United States Patent
Larochelle et al.

(10) Patent No.: US 12,567,715 B2
(45) Date of Patent: Mar. 3, 2026

(54) OPTICAL FIBER AMPLIFIER FOR REDUCING DIFFERENTIAL MODAL GAIN OF AN OPTICAL FIBER

(71) Applicants:Huawei Technologies Canada Co., Ltd., Kanata (CA); Universite Laval, Quebec (CA)

(72) Inventors: Sophie Larochelle, Quebec (CA); Charles Matte-Breton, Quebec (CA); Pierre-Olivier Janvier, Levis (CA); Leslie Ann Rusch, Quebec (CA); Lixian Wang, Quebec (CA)

(73) Assignees: Huawei Technologies Canada Co., Ltd., Kanata (CA); Universite Laval, Quebec (CA)

( * ) Notice: Subject to any disclaimer, the term of this patent is extended or adjusted under 35 U.S.C. 154(b) by 779 days.

(21) Appl. No.: 17/895,609

(22) Filed: Aug. 25, 2022

(65) Prior Publication Data

US 2024/0072506 A1 Feb. 29, 2024

(51) Int. Cl.
*H01S 3/00* (2006.01)
*H01S 3/067* (2006.01)
*H01S 3/16* (2006.01)

(52) U.S. Cl.
CPC ........ *H01S 3/06737* (2013.01); *H01S 3/1698* (2013.01)

(58) Field of Classification Search
CPC ........................... H01S 3/06737; H01S 3/1698
See application file for complete search history.

(56) References Cited

U.S. PATENT DOCUMENTS

| | | | |
|---|---|---|---|
| 9,077,148 B2 | 7/2015 | Abedin et al. | |
| 2015/0077837 A1* | 3/2015 | Abedin | H01S 3/06716 |
| | | | 359/341.5 |
| 2019/0341737 A1* | 11/2019 | Dragic | H01S 3/06733 |

FOREIGN PATENT DOCUMENTS

| | | | | |
|---|---|---|---|---|
| CN | 202486354 U | * | 3/2012 | G02B 6/036 |
| CN | 202522729 U | * | 11/2012 | G02B 6/02 |

(Continued)

OTHER PUBLICATIONS

Jin et al., "Tailored modal gain in a multi-mode erbium-doped fiber amplifier based on engineered ring doping profiles" retrieved from https://www.spiedigitallibrary.org/conference-proceedings-of-spie/8915/89150A/Tailored-modal-gain-in-a-multi-mode-erbium-doped-fiber/10.1117/12.2033945.full?SSO=1.

(Continued)

*Primary Examiner* — Mark Hellner
(74) *Attorney, Agent, or Firm* — BCF LLP

(57) ABSTRACT

An optical fiber and an optical amplifier including the optical fiber are disclosed, the optical fiber includes a core region for guiding a propagation of a multimode optical signal, a cladding region laterally surrounding the core region and at least two doped rings, each of the at least two doped rings having a corresponding rare-earth or transition metal dopant concentration. The core region includes a central core having a first refractive index, at least one core layer laterally surrounding the central core, each of the at least one core layer having corresponding internal and external radii, an internal radius of an innermost core layer corresponding to a radius of the central core and an external radius of the outermost core layer corresponding to a radius of the core region.

19 Claims, 11 Drawing Sheets

315

305

$a_1$ $a_3$ $a_2$ a $305_N$ $305_2$ $305_1$

310

(56) References Cited

FOREIGN PATENT DOCUMENTS

| FR | 2852154 A1 | * | 9/2004 | ......... H01S 3/06754 |
|---|---|---|---|---|
| JP | 2015167158 A | * | 9/2015 | ............. H01S 3/067 |

OTHER PUBLICATIONS

Zeng et al., "Rigorous FM-EDF design with an oversized two-layer erbium ion distribution for C-band DMG mitigation", J. Opt. Soc. Am. B, JOSAB 38, F1-F7 (2021).

Kang et al., "Minimizing differential modal gain in cladding-pumped EDFAs supporting four and six mode groups", Opt. Express, OE 22, 21499-21507, (2014).

Qiu et al., "Six-mode extended L-band EDFA with a low differential modal gain", OSA Continuum, OSAC 4, 1676-1687 (2021).

Wada et al., "Differential Modal Gain Reduction of L-band 5-Mode EDFA Using EDF With Center Depressed Core Index", J. Lightwave Technol., JLT 35, 762-767 (2017).

* cited by examiner

OPTICAL FIBER AMPLIFIER FOR REDUCING DIFFERENTIAL MODAL GAIN OF AN OPTICAL FIBER

CROSS-REFERENCE TO RELATED APPLICATIONS

This is the first application filed for the instantly disclosed technology.

TECHNICAL FIELD

The present disclosure relates generally to the field of optical communications and, in particular, to an optical fiber amplifier for reducing differential modal gain of an optical fiber.

BACKGROUND

Digital activities relying on optical communication lines such as optical fibers have gained traction over the last decade. Remote work, video streaming, video calls and online shopping are some of the activities that have grown the most. However, maximum data transmission capacity of a given optical fiber is limited by nonlinear effect, which set fundamental capacity scalability limits usually referred to as the "Shannon limits". Some technologies have attempted to address the problem of this increasing demand for new unoccupied bandwidth by expanding the usable optical frequency bands, for example, in addition to the C- and L-band, to use the S- (1470 nm~1510 nm), E- (1410 nm~1470 nm) and U- (1630 nm~1680 nm) bands. However, transmission of optical signals occupying such an ultra-wideband wavelength range rises new challenges due to physical phenomena such as Raman scattering effect. Another limiting factor is that the available amplifier technology for the new bands is not mature yet.

Other technologies rely on space division multiplexing (SDM), in which multiple spatial lanes transmit data in parallel through multiple single mode optical fibers, multiple single mode fiber cores that are located in one piece of optical fiber, or multiple optical spatial modes in an optical multimode fiber (MMF).

The multimode fibers (MMF) have the highest spatial density compared to solutions relying on multiple single mode optical fibers or multiple single mode fiber cores that are located in one piece of optical fiber. This is because that the spatial lanes in MMFs (i.e. the spatial modes) have large spatial overlap in the fiber core. This feature allows the transmission of more information in a given area of fiber cross section, therefore is highly desirable for SDM systems.

However, the optical powers of the spatial modes tend to have a large ripple after being transmitted along the MMF, each spatial mode corresponding to a spatial lane. As a result, some spatial modes fall out of the receivable power range, leading to information loss. This is due to each spatial mode being affected by a different gain along the optical communication line.

There is thus an interest in developing systems to compensate the transmission loss of spatial modes of the optical signal, i.e. to minimize a differential modal gain (DMG) of the optical communication line.

SUMMARY

The implementations of the present disclosure have been developed based on developers' appreciation of the limitations associated with the prior art.

Developers of the present technology have devised systems for providing optical communication lines that deliver substantially low DMG, and such that the DMG is substantially immune to the variation of a length of a doped fiber in optical amplifiers of the optical communication lines as well as the variation of an input power of a multimode optical signal propagating in the optical communication lines.

In accordance with a first broad aspect of the present disclosure, there is provided an optical fiber including a core region for guiding a propagation of a multimode optical signal, the core region defining a circular cross-section. The core region includes a central core having a first refractive index, at least one core layer laterally surrounding the central core. Each of the at least one core layer has a corresponding internal radius, an internal radius of an innermost core layer corresponding to a radius of the central core, a corresponding external radius, an external radius of the outermost core layer corresponding to a radius of the core region and a corresponding refractive index below the first refractive index, the refractive indexes of the at least one core layer decreasing as the internal radius of the at least one core layer increases to form a step refractive index profile. The optical fiber further includes a cladding region laterally surrounding the core region, the cladding region having a second refractive index below any refractive index of the at least one core layer and at least two doped rings, each of the at least two doped rings having a corresponding rare-earth or transition metal dopant concentration.

In at least one implementation, the optical fiber is a multimode optical fiber in which the multimode optical signal propagating therein includes a plurality of linearly polarized modes, a position of the at least two doped rings within the optical fiber being determined based on normalized mode field distribution $i_k(r)$ of each linearly polarized mode k.

In at least one implementation, a number of the at least two doped rings and rare-earth or transition metal dopant concentrations thereof are determined, based on a number of modes to be propagated in the optical fiber, a number of the at least one core layer, internal radii, external radii and refractive indexes of the at least one core layer, such that the two following criteria are met:

$$\frac{\max(\Gamma_k) - \min(\Gamma_k)}{2} \le \frac{1}{K}\sum_{k=1}^{K} \Gamma_k \times T_1; \tag{1}$$

$$\text{and } \frac{\max\{i_{tot}(r)\} - \min\{i_{tot}(r)\}|_{r\in\{doped\,region\}}}{2} \le \tag{2}$$

$$\text{average}\{i_{tot}(r)|_{r\in\{doped\,region\}}\} \times T_2,$$

$$\text{wherein: } \Gamma_k = \sum_{n=1}^{N}\left\{2\pi\int_{r=0}^{\infty} i_k(r)\times\rho_n(r)rdr\right\},$$

$\rho_n(r)$ being a rare-earth or transition metal dopant concentration distribution of the n-th doped ring; $i_{tot}(r)=\sum_{k=1}^{K}i_k(r)$; $T_1$ being a first pre-determined threshold and $T_2$ being a second pre-determined threshold. K is the total number of guided modes while N is the total number of rare-earth or transition-metal doped rings.

In at least one implementation, the first pre-determined threshold is 0.025, and the second pre-determined threshold is 0.1.

In at least one implementation, the radius of the core region is between 18 and 22 μm.

In at least one implementation, the cladding region is made of silica.

In at least one implementation, the cladding region has an external radius between 115 μm and 135 μm.

In at least one implementation, the at least one core layer includes a single core layer having a corresponding refractive index lower than the refractive index of the central core.

In at least one implementation, the at least two doped rings are doped with bismuth or one or more dopants selected from a group consisting of erbium, ytterbium, neodymium, thulium, praseodymium, and holmium.

In at least one implementation, the at least two doped rings are doped with erbium ions and ytterbium ions, a concentration of the ytterbium ions in the at least two doped rings being between 10 and 30 times higher than a concentration of the erbium ions therein.

In at least one implementation, the at least two doped rings include a first doped ring having erbium ion concentration of between $1.3 \times 10^{25}$ m$^{-3}$ and $1.7 \times 10^{25}$ m$^{-3}$, and a second doped ring having erbium ion concentration of between $1.8 \times 10^{25}$ m$^{-3}$ and $2.2 \times 10^{25}$ m$^{-3}$.

In at least one implementation, the optical fiber further includes a polymer layer surrounding the cladding region, the polymer layer having a refractive index below the refractive index of the cladding region.

In at least one implementation, the optical fiber is a multimode optical fiber such that the multimode optical signal propagating therein includes six linearly polarized modes: $LP_{01}$, $LP_{11a}$, $LP_{11b}$, $LP_{02}$, $LP_{21a}$ and $LP_{21b}$.

In at least one implementation, the at least two doped rings are located in the core region.

In accordance with a second broad aspect of the present disclosure, there is provided an optical amplifier for amplifying a multimode optical signal. The optical amplifier includes an input for receiving the multimode optical signal, a pump source configured for generating an optical pump signal, a signal combiner configured to combine the received multimode optical signal with the optical pump signal, and a span of the aforementioned optical fiber, the signal combiner being further configured to inject the combined signal at an input of the span of optical fiber, the span extending between the signal combiner and an output of the optical amplifier.

In at least one implementation, a length of the of optical fiber is between 2 meters and 45 meters.

In at least one implementation, the optical pump signal has a wavelength of between 970 nm and 990 nm and an optical power of 20 W.

In at least one implementation, the optical amplifier further includes one or more isolators disposed at the input and/or at an output of the optical amplifier.

In at least one implementation, the pump source is a first pump source, the signal combiner is a first signal combiner, the optical pump signal is a first optical pump signal, and the optical fiber is a first optical fiber defining a first span. The optical amplifier further includes a second pump source configured for generating a second optical pump signal, a second signal combiner configured to receive the multimode optical signal at an output of the first span and combine said multimode optical signal with the second optical pump signal, and a second span of the optical fiber, the second signal combiner being further configured to inject the combined signal at an input of the second span, the second span extending between the signal combiner and the output of the optical amplifier.

In at least one implementation, the optical amplifier further includes a multimode variable optical attenuator between the output of the first span of optical fiber and the second signal combiner.

In at least one implementation, the optical amplifier further includes a signal filtering device between the output of the first span of optical fiber and the second signal combiner.

BRIEF DESCRIPTION OF THE FIGURES

Further features and advantages of the present disclosure will become apparent from the following detailed description, taken in combination with the appended drawings, in which.

Figure 1:
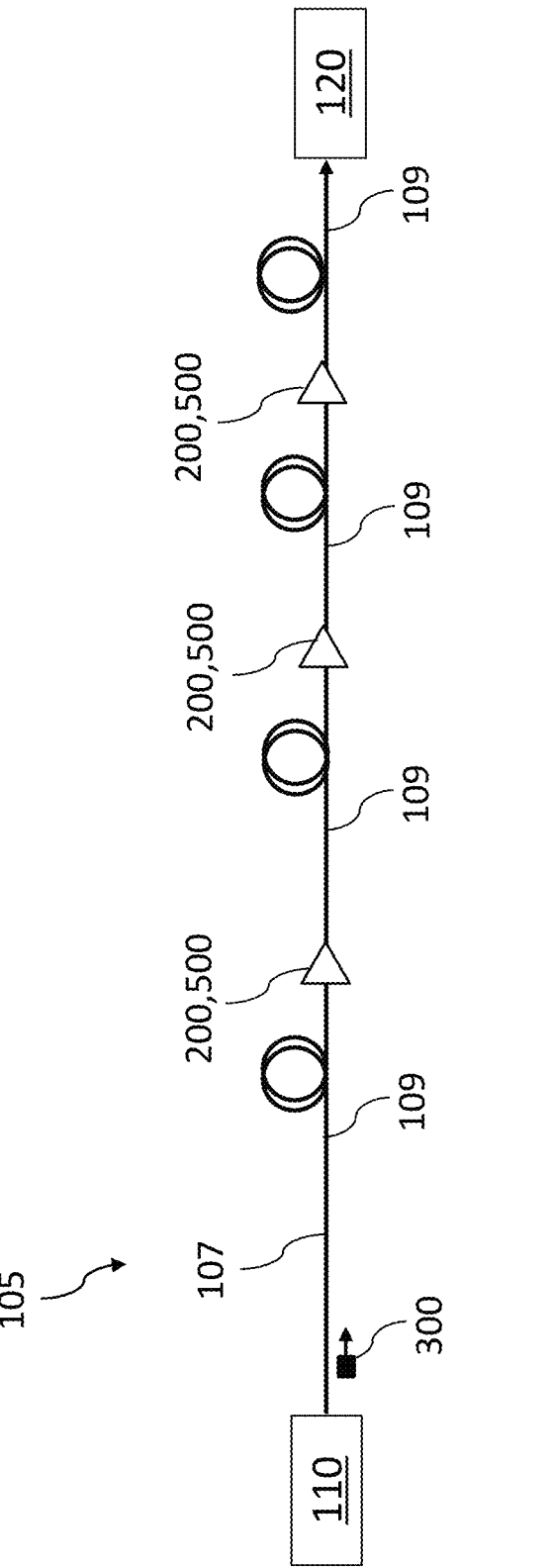
FIG. 1 is high-level diagram of an optical communication line including optical amplifiers in accordance with various non-limiting implementations of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes an optical fiber and an optical amplifier for reducing a differential modal gain (DMG) of an optical communication line.

As used herein, the term "about" or "approximately" refers to a +/−10% variation from the nominal value. It is to be understood that such a variation is always included in a given value provided herein, whether or not it is specifically referred to.

Unless otherwise defined or indicated by context, all technical and scientific terms used herein have the same meaning as commonly understood by one of ordinary skill in the art to which the described implementations appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in alike fashion (e.g., "between" versus "directly between," "adjacent" versus "directly adjacent," etc.).

In the context of the present specification, when an element is referred to as being "associated with" another element, in certain implementations, the two elements can be directly or indirectly linked, related, connected, coupled, the second element employs the first element, or the like without limiting the scope of the present disclosure.

In the context of the present disclosure, a multimode fiber (MMF) refers to an optical fiber, whose central core can support the simultaneous propagation of multiple optical spatial modes.

In the context of the present disclosure, a spatial mode refers to a self-consistent electric field distribution in a multimode waveguide used for multimode signal propagation, such as a multimode optical fiber (MMF). A given optical signal propagating in a MMF may be decomposed into a plurality of spatial modes, where $i_k(r)$ refers to a normalized mode field distribution of the k-th mode of the optical signal, r being a radius of the MMF.

In the context of the present disclosure, a differential modal gain (DMG) of a given multimode waveguide refers to the maximum gain difference, across the whole spectral band, among the modal gains of the spatial modes of the optical signal at a given wavelength.

The terminology used herein is only intended to describe particular representative implementations and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what is believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represents conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

In the context of the present disclosure, the expression "data" includes data of any nature or kind whatsoever capable of being stored in a database. Thus, data includes, but is not limited to, audiovisual works (images, movies, sound records, presentations, etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

Developers of the present technology have realized that multimode fibers (MMF) have the highest spatial density compared to solutions relying on multiple single mode optical fibers or multiple single mode fiber cores that are located in one piece of optical fiber. This is because the spatial lanes in MMFs (i.e. the spatial modes) have large spatial overlap in the fiber core. This feature allows the transmission of more information in a given area of fiber cross section, therefore is highly desirable for space division multiplexing (SDM) systems. As will be illustrated, the following description is directed to an MMF and optical amplifiers for an MMF. However, any system variation adapted for multiple single mode optical fibers or multiple single mode fiber cores that are located in one piece of optical fiber system can be adapted to execute implementations of the present technology, once teachings presented herein are appreciated.

With these fundamentals in place, the instant disclosure is directed to address at least some of the deficiencies of the current technology.

In FIG. 1, a high-level diagram of an optical communication line 105 is illustrated. The optical communication line 105 includes a waveguide 107 communicably connecting a transmitting device 110 to a receiving device 120 for transmitting an optical signal 300 therebetween. The waveguide 107 may be a conventional optical fiber such as, for example, a glass fiber surrounded by one or more coating layers. The waveguide 107 may include an optical fiber core which transmits the optical signal 300, and an optical cladding, which confines the optical signal within the optical fiber core. It is also contemplated that light emitted by the transmitting device 110, thereby defining the optical signal 300, may be single monochromatic, polychromatic, polarized, dual polarized, or randomly polarized, may have a particular polarization (e.g. linearly polarized, elliptically polarized, or circularly polarized). In this implementation, a wavelength of the optical signal 300 can be located in one or multiple of the following bands: E- (1400~1470 nm), S- (1470~1520 nm), C- (1520~1565 nm), L- (1565~1630 nm) and U- (1630 nm~1680 nm) bands.

In one implementation, the transmitting device 110 and the receiving device 120 are space division multiplexing reconfigurable optical add drop multiplexers (SDM ROADM), the transmitting device 110 combining two or more data streams to be carried by the optical signal 300 over the optical communication line 105, the receiving device 120 demultiplexing the optical signal 300. The receiving device 120 may further send parts of the demultiplexed optical signal 300 to corresponding receivers (not shown) for processing of the data.

In this implementation, the optical communication line 105 includes optical amplifiers 200. As such the waveguide 107 defines a plurality of waveguide spans 109 extending between two consecutive optical amplifiers 200, between the transmitting device 110 and a consecutive optical amplifier 200, and between a last-in-line optical amplifier 200 and the receiving device 120. Implementations where the optical communication line 105 includes a single optical amplifier 200 are also contemplated.

In this implementation, the waveguide 107 is a multimode waveguide 107 such that the optical signal 300 is a multimode optical signal 300 propagating over the optical communication line 105. For instance, the waveguide 107 may be an MMF. In the context of the present disclosure, each spatial mode of the multimode optical signal 300 is referred to as $i_k(r)$ being a function of the radius of the waveguide 107, $i_k(r)$ being representative of a normalized mode field distribution of the k-th spatial mode.

Figure 2:
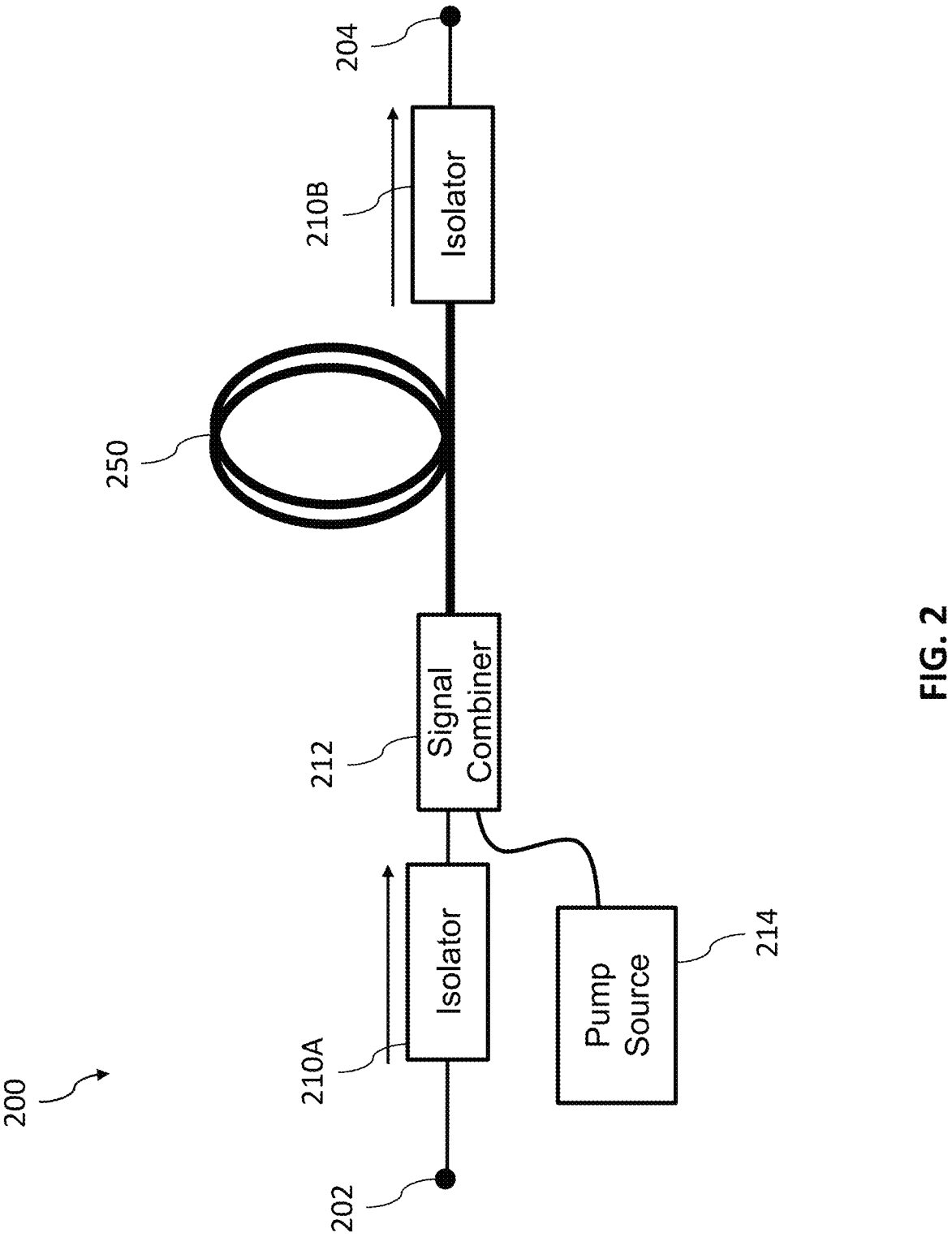
FIG. 2 is a schematic representation of an optical amplifier of FIG. 1.

With reference to FIG. 2, there is illustrated an optical amplifier 200 in accordance with non-limiting implementations of the present technology. The optical amplifier 200 includes an input 202 for receiving the multimode optical signal 300 from an upstream waveguide span 109. The optical amplifier 200 further includes a signal combiner 212, a multimode pump source 214 and a doped fiber 250. The optical amplifier 200 may be referred to as a "single stage" optical amplifier 200.

The multimode optical signal 300 to be amplified in the optical amplifier 200 is combined with a signal generated by the multimode pump source 214, or "optical pump signal", by the signal combiner 212 and further injected in the doped fiber 250. In other words, the multimode optical signal 300 and the pump signal are multiplexed into the doped fiber 250 such that the multimode optical signal 300 is amplified through interaction with the doping ions. The multimode pump source 214 may be, for example and without limitations, a laser diode. As a person skilled in the art would understand, amplification is achieved by stimulated emission of photons from dopant ions in the doped fiber 250. As will be described in greater detail below, the doped fiber 250 is doped with rare-earth ions such as erbium, ytterbium, neodymium, thulium, praseodymium, and/or holmium ions. In some implementations, the doped fiber 250 is doped with a transition metal such as bismuth. The pump signal excites ions into a higher energy from where they further decay via stimulated emission of a photon at a wavelength of the multimode optical signal 300 back to a lower energy level, where they may be further excited by the pump signal such that the multimode optical signal 300 is amplified in a continuous manner. It should be noted that each spatial mode of the multimode optical signal 300 is amplified with a corresponding gain (i.e. a corresponding amplification). An aspect of the present technology is to reduce the DMG of the multimode optical signal 300 upon being amplified in the doped fiber 250.

The optical amplifier 200 further includes an output 204 for transmitting the amplified multimode optical signal 300 to a downstream waveguide span 107. In this implementation, the optical amplifier 200 further includes a first isolator 210A at the input 202 and a second isolator 210B at the output 204 to prevent feedbacks of the multimode optical signal 300 from occurring.

Figure 3:
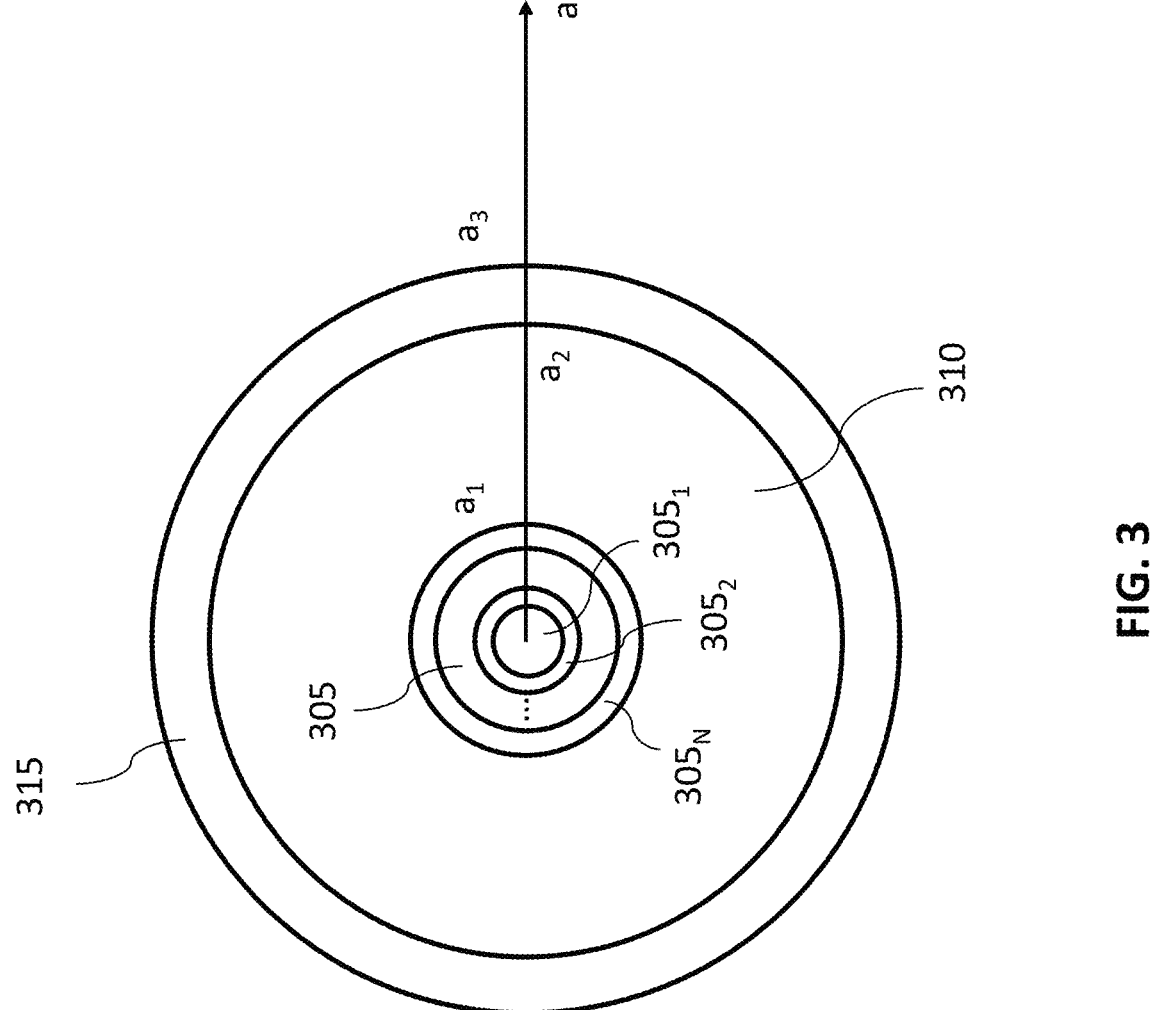
FIG. 3 is a schematic representation of a cross section of an optical fiber in accordance with various non-limiting implementations of the present disclosure.

As best shown in FIG. 3, the doped fiber 250 includes a core region 305 for guiding propagation of the multimode optical signal 300, a cladding region 310 laterally surrounding the core region 305, and a polymer layer 315 surrounding the cladding region 310 to, in use, confine the pump signal wave within the cladding region 310. In this implementation, the core region 305 has a circular cross-section, and the cladding region 310 and the polymer layer 315 has annular cross sections. The core region 305 may also have a non-circular cross-section shape in alternative implementations.

In this implementation and as will be described in greater detail below, the core region 305 defines a step-index refractive index profile (RIP) such that the refractive index of the core region 305 decreases along the radius thereof. More specifically, the core region 305 includes a central core $305_0$ having a first refractive index $n_{10}$, and at least one core layer $305_i$ having a corresponding refractive index $n_{1i}$. In this illustrative implementation, a number of core layers is noted N. As such, the core region 305 may include intermediate core layers $305_i$ for i varying between 1 and N. Each core layer $305_i$ has an internal radius and an external radius, an internal radius of an innermost core layer $305_1$ corresponding to a radius of the central core $305_0$, an external radius of an outermost core layer $305_N$ corresponding to a radius of the core region 305. The refractive indexes of the central core $305_0$ and the core layers $305_i$ decreases for increasing radius (e.g. external radius). In other words, the refractive indexes as such that: $n_{11} > n_{11} > \ldots > n_{1N}$, thereby defining the step RIP of the core region 305.

In this implementation, the cladding region 310 is made of pure silica and has refractive index noted $n_2$ below any refractive index $n_{1i}$ of the core region 305. Furthermore, a refractive index of the polymer layer 315 has a refractive index noted $n_3$ below the refractive index $n_2$ of the cladding region 310. Hence, the refractive indexes of the doped fiber 250 are such that $n_{10} > n_{11} > \ldots > n_{1N} > n_2 > n_3$.

In this implementation, a radius of the core region 305, noted $a_1$, is between 18 and 22 μm (i.e. about 20 μm), and an external radius of the cladding region 310, noted $a_2$, is between 115 μm and 135 μm (i.e. about 125 μm). Furthermore, in this implementation, radii of the core region 305, the cladding region 310, and the polymer layer 315 and refractive indexes thereof (including the step RIP of the core region 305) are adapted, to support guidance of six spatial modes along the doped fiber 250, the six spatial modes being noted $LP_{01}$, $LP_{11a}$, $LP_{11b}$, $LP_{02}$, $LP_{21a}$, $LP_{21b}$.

Figure 4:
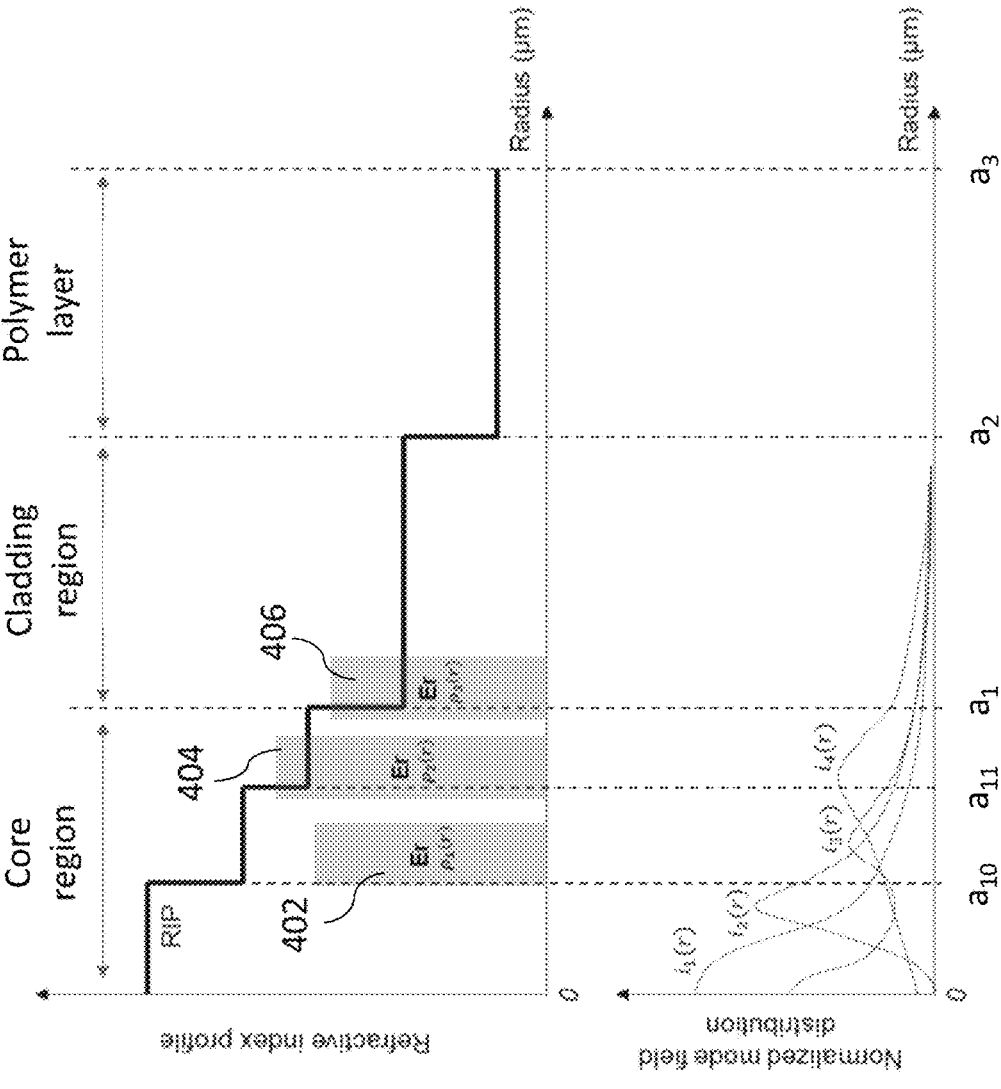
FIG. 4 is a diagram of a structure of the optical fiber of FIG. 3.

More specifically, with reference to FIG. 4, there is depicted refractive index of the doped fiber 250 according to the radius thereof, $a_{10}$ referring to the external radius of the central core 305₀ of the core region 305, $a_{11}$ referring to the external radius of a first core layer 305₁ of the core region 305 and $a_3$ referring to the external radius of the polymer layer 315. As such, in the illustrative implementation of FIG. 4, the core region 305 includes the central core 305₀ and two core layers, an external radius of an outermost core layer corresponding to $a_1$.

In the illustrative implementation of FIG. 4, an ion doping profile of the doped fiber 250 defines a discrete multi-ring structure including three doped rings 402, 404, 406. The discrete multi-ring structure may include an alternative number of doped rings in other implementations. In this implementation, each of the doped rings 402, 404, 406 has a respective ion concentration noted $\rho_1(r)$, $\rho_2(r)$, $\rho_3(r)$ respectively. As shown on FIG. 4, one or more of the doped rings may be defined in the core region 305, in the cladding region 310 and/or overlap a junction between the core region 305 and the cladding region 310, as illustrated for the doped ring 406 in FIG. 4.

Normalized mode field distributions of four spatial modes $i_k(r)$ are also depicted to ease an understanding of FIG. 4. It should be noted that most of the field distributions of the spatial modes are located in the core region 305.

In this implementation, developers of the present technology have devised the doped fiber 250 such that the optical amplifier 200 delivers substantially low DMG, such that the DMG is substantially immune to the variation of a length of the doped fiber 250 in the optical amplifier 200 as well as the variation of the input power of the multimode optical signal 300 at the input 202.

To do so, developers of the present technology have realized that, in a first aspect, differences among the modal gains (i.e. gains of the spatial modes) should be minimized or reduced. As such, modal overlap factor of $\Gamma_k$ of each spatial modes has to be determined and the following criterion should be met:

$$\frac{\max(\Gamma_k) - \min(\Gamma_k)}{2} \leq \frac{1}{K}\sum_{k=1}^{K} \Gamma_k \times T_1 \qquad (1)$$

$$\text{where } \Gamma_k = \sum_{n=1}^{N}\left\{2\pi\int_{r=0}^{\infty} i_k(r) \times \rho_n(r) r\, dr\right\},$$

$\rho_n(r)$ being a rare-earth or transition metal dopant concentration distribution of the n-th doped ring, K is the number of spatial modes and $T_1$ is a first threshold.

This criterion guarantees that the difference among the modal gains is minimized when the ions of the doped rings are strongly pumped to reach about 100% of inversion level. This criterion may be referred to as the "small-signal gain"

given that, in use, a high inversion level usually occurs when the input power is relatively low.

Furthermore, in order to develop the devised doped fiber 250, the developers of the present technology have realized that, in a second aspect, a sum $i_{tot}(r)$ of the normalized mode field distributions spatial mode $i_k(r)$ should have a minimized or reduced variation in the doped region of the doped fiber 250 (i.e. in the discrete multi-ring structure in this implementation). As such, the following criterion should be met:

$$\frac{\max\{i_{tot}(r)\} - \min\{i_{tot}(r)\}|_{r\in\{doped\,region\}}}{2} \leq \qquad (2)$$

$$\text{average}\{i_{tot}(r)|_{r\in\{doped\,region\}}\} \times T_2$$

$$\text{where } i_{tot}(r) = \sum_{k=1}^{K} i_k(r)$$

and $T_2$ is a second threshold.

This criterion is to minimize the variation of $i_{tot}(r)$ in the doped region of the doped fiber 250. When the optical power of the multimode optical signal 300 varies changes along the doped fiber 250, different doped regions (e.g. different doped rings) may receive similar total optical intensity. Consequently, the inversion levels in the doped regions may be close to each other. As a result, the modal gains may saturate in a similar way along the doped fiber 250 such that variation of the $i_{tot}(r)$ is minimized.

Figure 5:
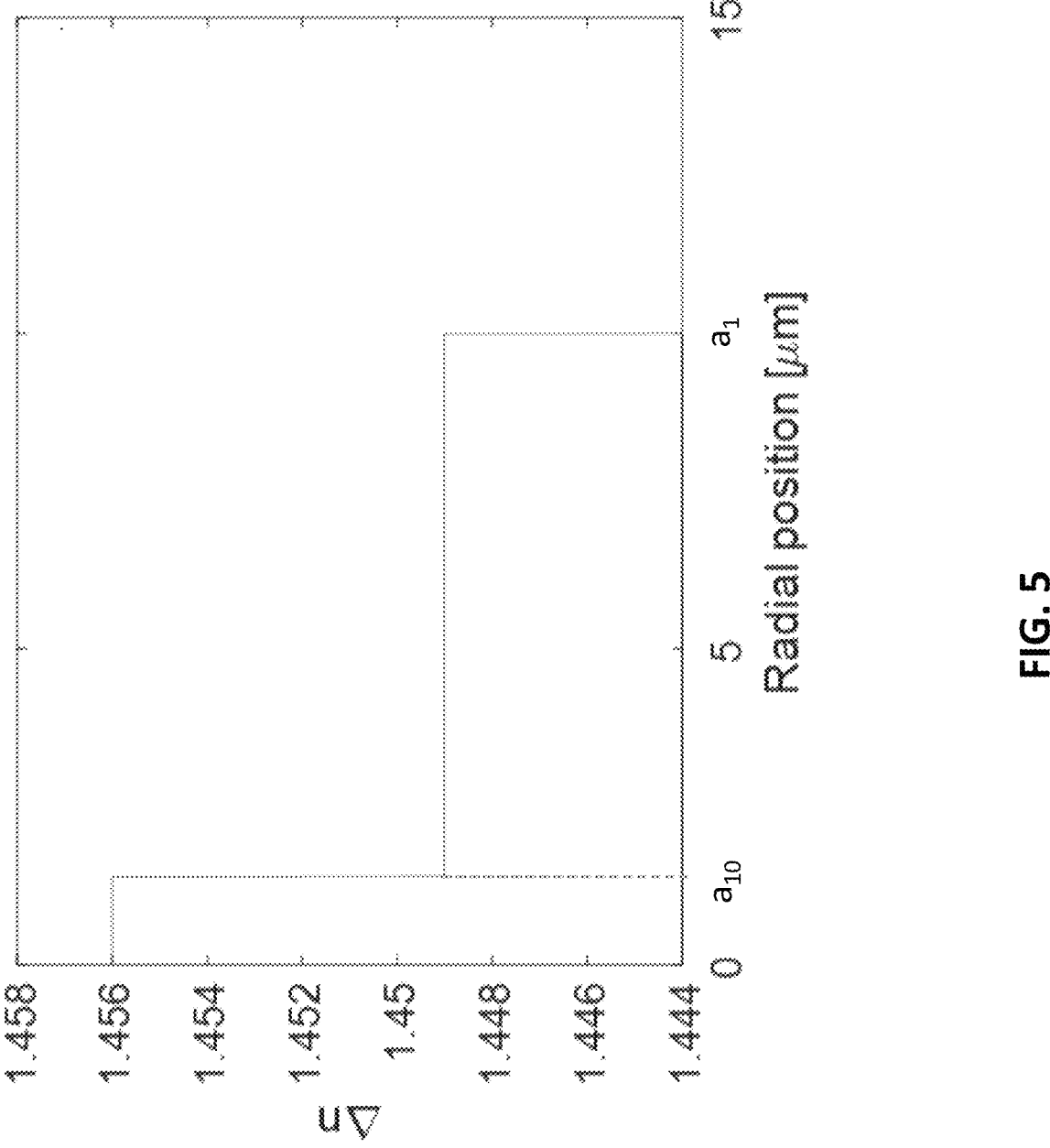
FIG. 5 is a diagram of a refractive index of a core region of the optical fiber of FIG. 3.
Figure 6:
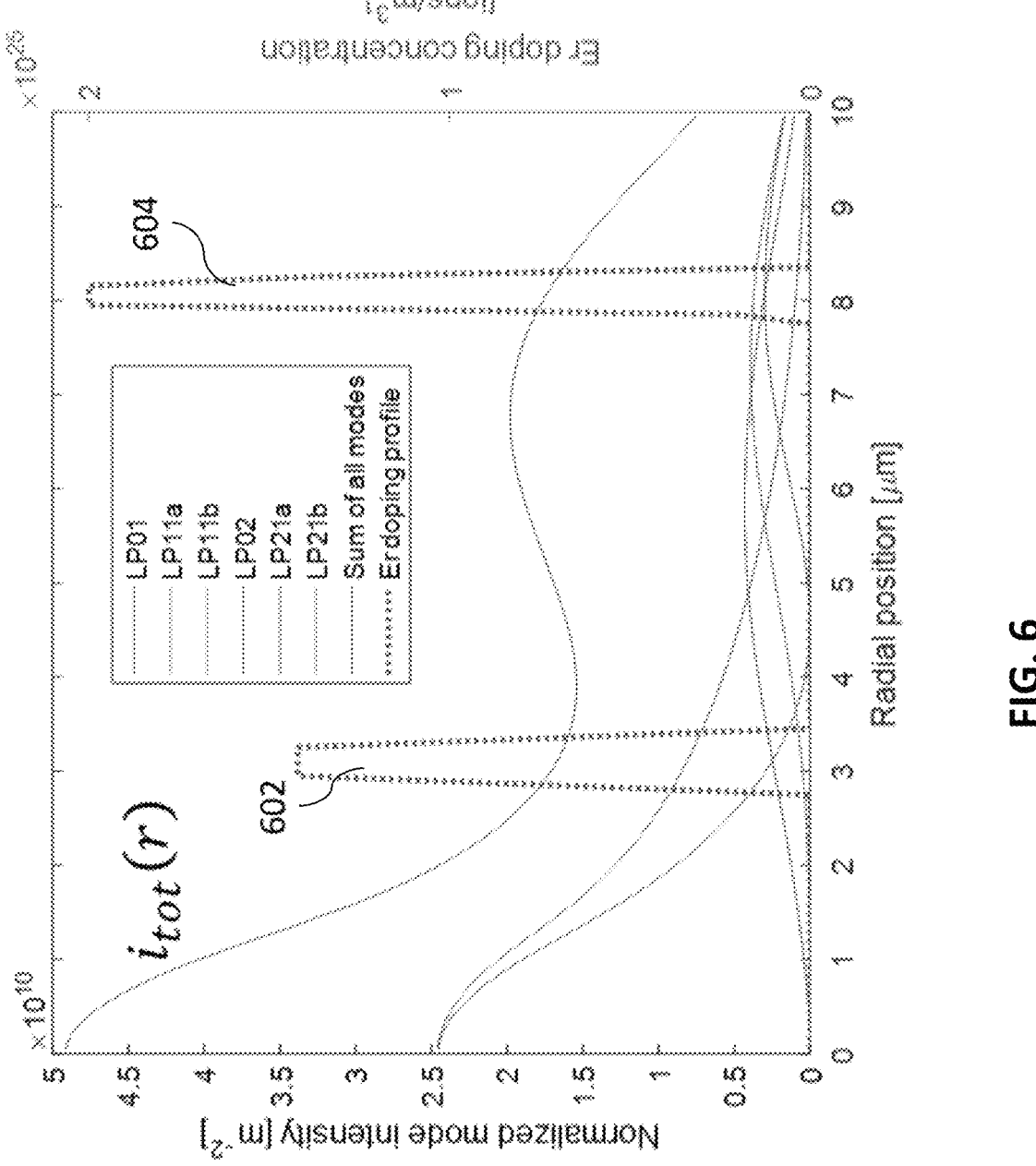
FIG. 6 is a diagram of doped rings of the optical fiber of FIG. 3 and spatial modes propagating there along.

Experimental results are shown later in the present disclosure with respect to FIGS. 7 to 10. FIGS. 5 and 6 illustrates characteristics of the doped fiber 250 implemented in the optical amplifier 200 used for obtaining said experimental results. Developers of the present technology have developed the doped fiber 250 such that the two afore described criteria are met with $T_1 = 2.5\%$ and $T_2 = 10\%$. The combination of the two criteria has led the developers of the present technology to devise the doped fiber 250 such that optical amplifier 200 or any optical amplifier relying on the doped fiber 250 may deliver low DMG, the DMG being substantially immune to the variation of the length of the doped fiber 250 and substantially immune to variation of the input power of the multimode optical signal 300.

FIG. 5 illustrates a step RIP of the core region 305 used for obtaining said experimental results. More specifically, in this implementation, the core region 305 includes a single core layer 305₁ laterally surrounding the central core 305₀. The central core 305₀ has a refractive index $n_{10}$ of about 1.456, and the core layer 305₁ has a refractive index $n_{11}$ of about 1.449. Additionally, the central core 305₀ has a radius of about 1.5 μm and the core layer 305₁ has a radius of about 10 μm.

FIG. 6 illustrates a discrete multi-ring structure of the doped fiber 250 for obtaining the experimental results of FIGS. 7 to 10. In this implementation, the discrete multi-ring structure is located in the core region 305 and includes a first doped ring 602 and a second doped ring 604. The first doped ring 602 has an internal radius of about 2.8 μm, an external radius of 3.3 μm and a maximal ion concentration of about $1.5 \times 10^{25}$ m⁻³. The second doped ring 604 has an internal radius of about 7.8 μm, an external radius of 8.3 μm and a maximal ion concentration of about $2 \times 10^{25}$ m⁻³. In this implementation, the first and second doped rings 602, 604 are doped with erbium ions. As such, it should be understood that the doped fiber 250 may be referred as an Erbium Doped Fiber (EDF) and may be used to form an Erbium Doped Fiber Amplifier (EDFA) such as the optical amplifier 200 or any other EDFA.

In alternative implementations, ytterbium ions are co-doped with the erbium ions and respective concentrations of the ytterbium ions in the doped rings 602, 604 are 10 to 30 times the respective concentrations of the erbium ions therein. In those alternative implementations, the doped fiber 250 may be referred as an Erbium Ytterbium Doped Fiber (EYDF) and may be used to form an Erbium Ytterbium Doped Fiber Amplifier (EYDFA) such as the optical amplifier 200 in those alternative implementations or any other EYDFA The following experimental results are obtained in a situation where the optical communication line including a single optical amplifier 200, the transmitting device 110 being disposed at the input 202 of the optical amplifier 200, the doped fiber 250 of the optical amplifier 200 having characteristics corresponding to those described with respect to FIGS. 3, 5 and 6. A wavelength of the multimode optical signal 300 is set between 1530 and 1565 nm, a wavelength of the pump source 214 is set at about 978 nm with an optical power of about 20 W. Besides, an input power of the multimode optical signal 300 at the input 202 is set at −9 dBm for obtaining the experimental results of FIGS. 7 to 9.

Figure 7:
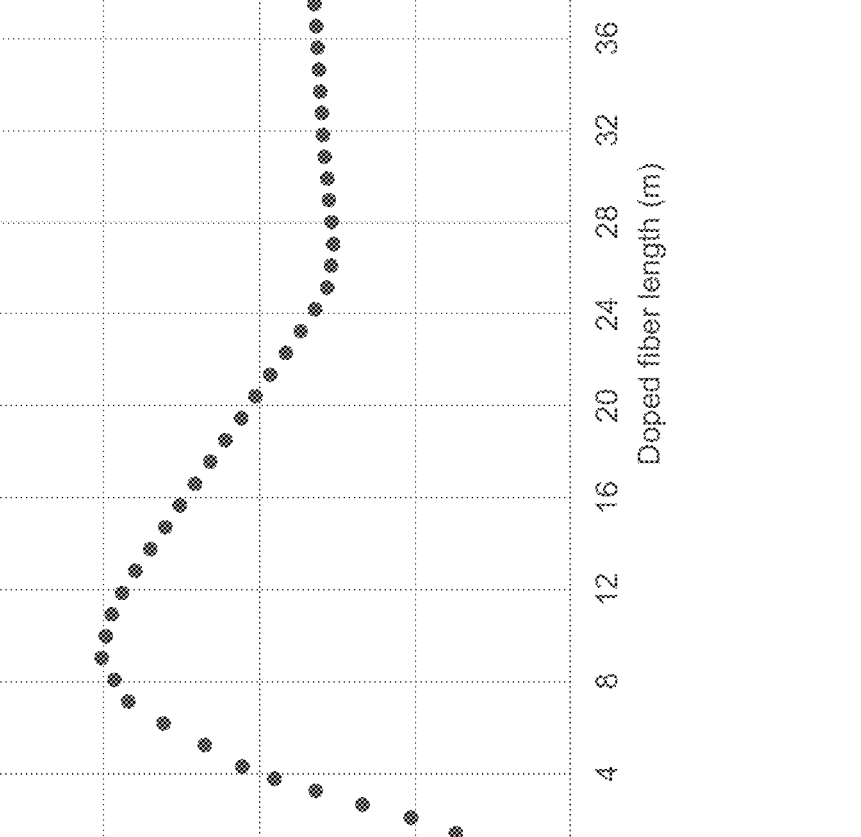
FIG. 7 is a diagram of an evolution of a differential modal gain (DMG) of the optical fiber of FIG. 3 according to a length thereof.

FIG. 7 illustrates experimental measurements of the DMG in decibels (dB) of the doped fiber 250 according to a length thereof. As can be seen on FIG. 7, the DMG may be considered independent of a length of the doped fiber 250 given that it varies between about 0.15 dB and 0.3 dB for a length set between 4 and 44 meters, which are typical lengths of doped fiber used in optical amplifiers.

Figure 8:
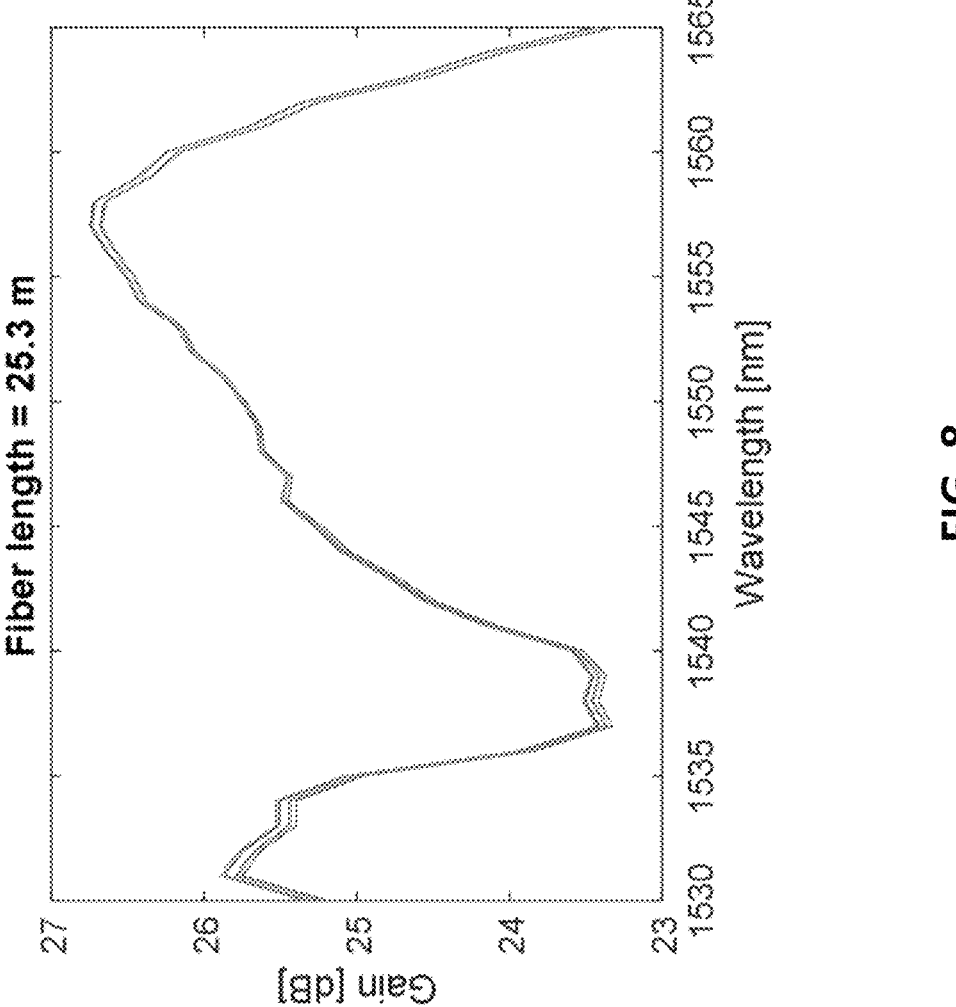
FIG. 8 is a diagram of the gain of the optical fiber of FIG. 3 for different spatial modes according to a wavelength of the optical signal.

FIG. 8 shows a plurality of curves, each curve being representative of a gain of a given spatial mode according to a wavelength of the multimode optical signal 300. As can be seen, for any given wavelength the gains of all the spatial modes are substantially identical, which causes the DMG to be reduced. It should be noted that the diagram of FIG. 8 has been obtained for a length of the doped fiber 250 being set at 25.3 m.

Figure 9:
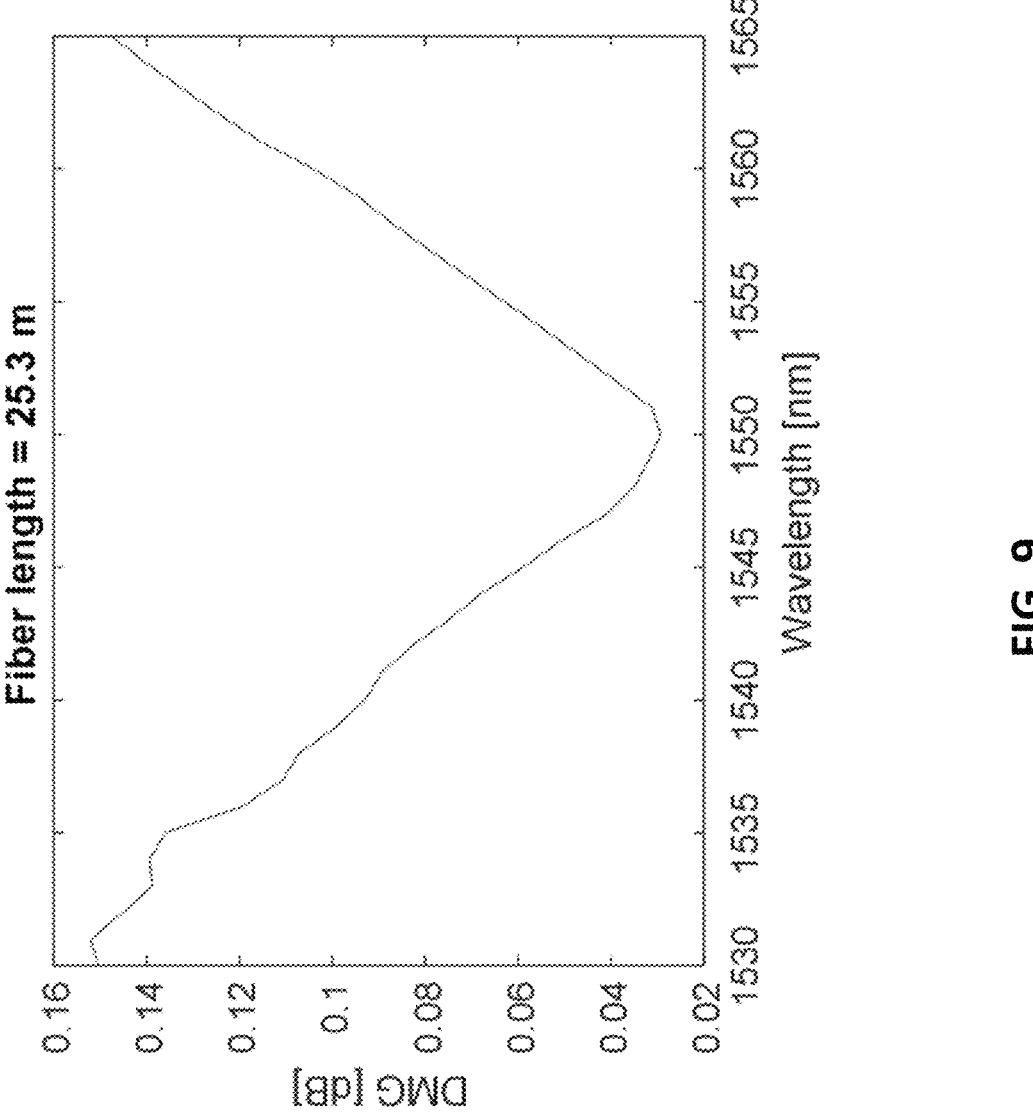
FIG. 9 is a diagram of the DMG of the optical fiber of FIG. 3 according to a wavelength of the optical signal.

With respect to FIG. 9, there is shown the DMG measured according to the wavelength of the multimode optical signal 300. As can be seen, the DMG varies between about 0.03 dB and 0.15 dB for the wavelength varying between 1530 nm and 1565 nm.

Figure 10:
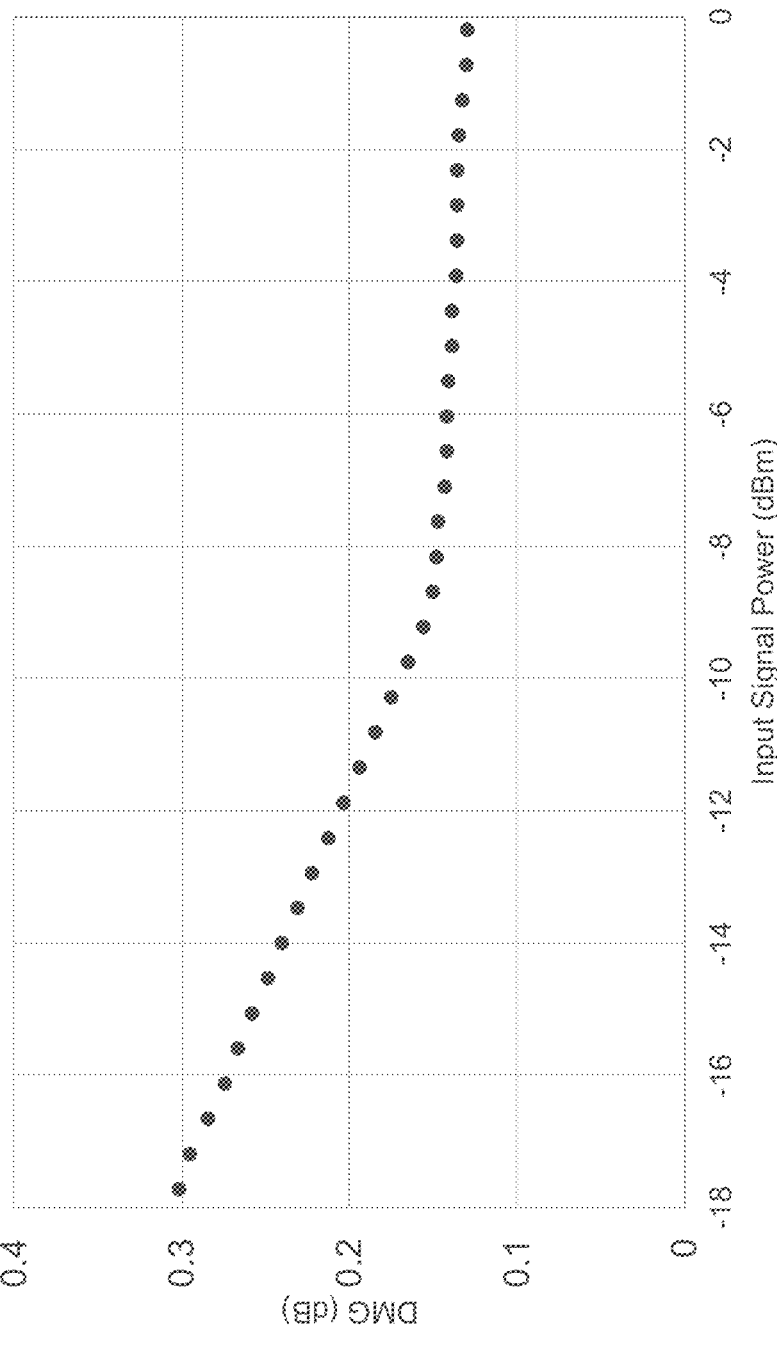
FIG. 10 is a diagram of the DMG of the optical fiber of FIG. 3 according to an input signal power of the optical signal.

With respect to FIG. 10, there is shown the DMG measured according to an input power of the multimode optical signal 300, the input power being measured at the input 202 of the optical amplifier 200. As can be seen, the DMG varies between about 0.3 dB and 0.12 dB for the input power varying between −18 dBm and 0 dBm.

Figure 11:
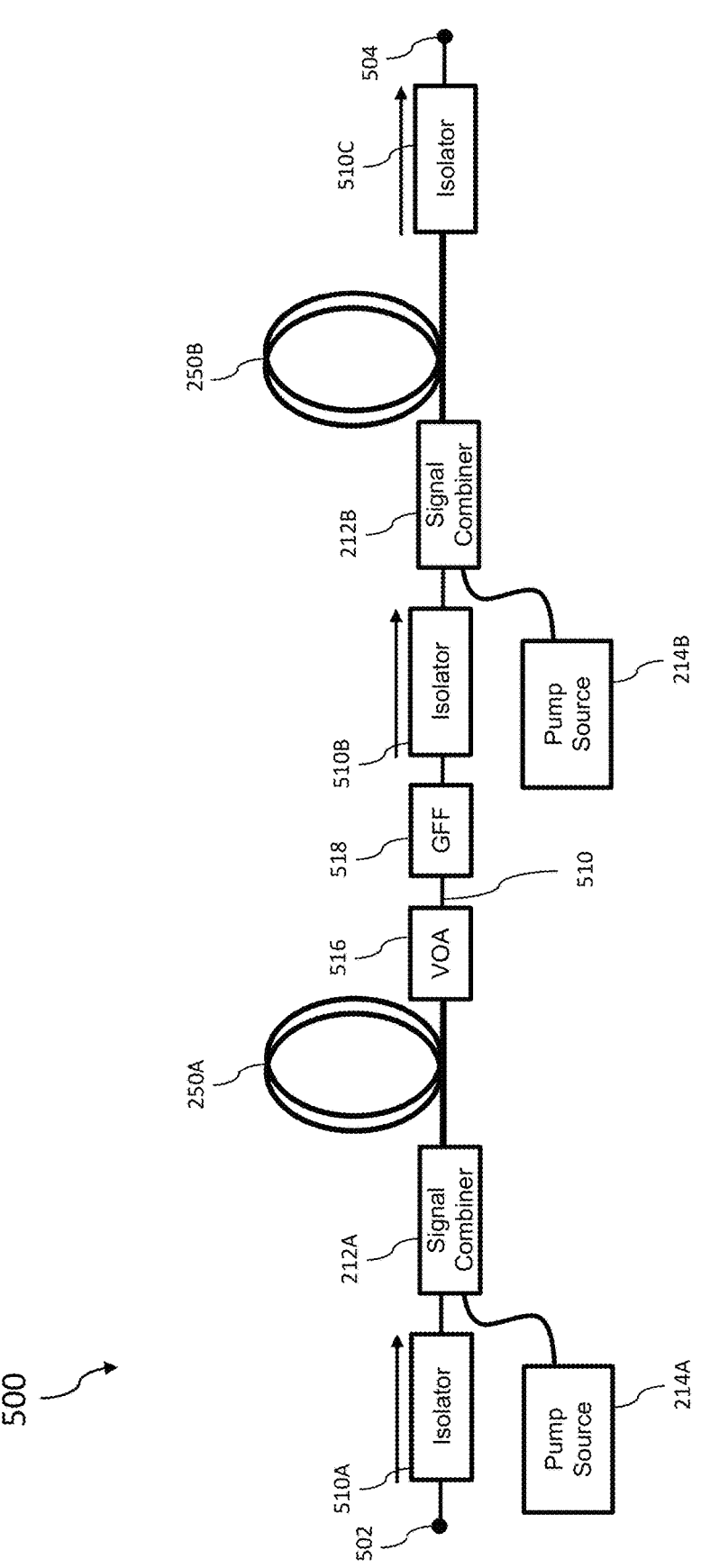
FIG. 11 is schematic representation of an optical amplifier of FIG. 1 in accordance with another implementation of the present disclosure.

In some implementations and with reference to both of FIGS. 1 and 11, the doped fiber 250 may be used in a two-stage optical amplifier 500 that may be implemented in the optical communication line 105. As best shown on FIG. 11, the two-stage optical amplifier 500 includes an input 502 for receiving the multimode optical signal 300 from an upstream waveguide span 109. In a first stage, the two-stage optical amplifier 500 further includes a first signal combiner 212A, a first multimode pump source 214A and a first span 250A of doped fiber 250. The multimode optical signal 300 is thus amplified in the first span 250A as it has been described herein above with respect to the optical amplifier 200. More specifically, the multimode optical signal 300 is multiplexed with a first pump signal of the first pump source 214A by the first signal combiner 212A into the first span 250A of doped fiber 250, such that the multimode optical signal 300 is amplified a first through interaction with the doping ions of the first span 250A.

In a second stage of the two-stage optical amplifier 500, the amplified multimode optical signal 300 is further injected in a second signal combiner 212B and multiplexed with a second pump signal of the second pump source 214B by the second signal combiner 212B into a second span 250B of doped fiber 250, such that the multimode optical signal 300 is further amplified through interaction with the doping ions of the second span 250B

The two-stage optical amplifier 500 further includes an output 504 for transmitting the multimode optical signal 300 to a downstream waveguide span 107. In this implementation, the two-stage optical amplifier 500 further includes a first isolator 510A at the input 502, a second isolator 510B at an input of the second signal combiner 212B and a third isolator 510C at the output 204 to prevent feedbacks of the multimode optical signal 300 from occurring in the two-stage optical amplifier 500.

In this implementation, the two-stage optical amplifier 500 further includes a multimode variable optical attenuator (VOA) 516 at an output of the first span 250A of doped fiber 250 and a gain flattening filter (GFF) 518 directly downstream the VOA 516. The VOA 516 may support propagation of multimode optical signals and be used for adjusting a global gain level of the two-stage optical amplifier 500 by attenuating the multimode optical signal 300 propagating therein. The GFF 518 may be used to equalize optical power of wavelength division multiplexing signals, such as the multimode optical signal 300 in case multimode optical signal 300 is not a monochromatic optical signal. In this implementation, propagation of the multimode optical signal 300 between the first span 250A and the second span 250B of doped fiber 250 is operated over a passive MMF such as the waveguide span 107.

It will be understood that, although the implementations presented herein have been described with reference to specific features and structures, it is clear that various modifications and combinations may be made without departing from such disclosures. The specification and drawings are, accordingly, to be regarded simply as an illustration of the discussed implementations or implementations and their principles as defined by the appended claims, and are contemplated to cover any and all modifications, variations, combinations or equivalents that fall within the scope of the present disclosure.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An optical fiber, comprising:
   a core region for guiding a propagation of a multimode optical signal, the core region defining a circular cross-section, the core region comprising:
   a central core having a first refractive index;
   at least one core layer laterally surrounding the central core, each of the at least one core layer having:
   a corresponding internal radius, an internal radius of an innermost core layer corresponding to a radius of the central core;

a corresponding external radius, an external radius of an outermost core layer corresponding to a radius of the core region; and a corresponding refractive index below the first refractive index, the refractive indexes of the at least one core layer decreasing as the internal radius of the at least one core layer increases to form a step refractive index profile;

a cladding region laterally surrounding the core region, the cladding region having a second refractive index below any refractive index of the at least one core layer; and at least two doped rings, each of the at least two doped rings having a corresponding rare- earth or transition metal dopant concentration, the optical fiber being a multimode optical fiber in which the multimode optical signal propagating therein comprises a plurality of linearly polarized modes, a position of the at least two doped rings within the optical fiber being determined based on normalized mode field distribution $i_k(r)$ of each linearly polarized mode k.

2. The optical fiber of claim 1, wherein, based on a number of modes to be propagated in the optical fiber, a number of the at least one core layer, internal radii, external radii and refractive indexes of the at least one core layer, a number of the at least two doped rings and rare-earth or transition metal dopant concentrations thereof are determined such that the two following criteria are met:

$$\frac{\max(\Gamma_k) - \min(\Gamma_k)}{2} \leq \frac{1}{K}\sum\nolimits_{k=1}^{K} \Gamma_k \times T_1; \quad (1)$$

and $\dfrac{\max\{i_{tot}(r)\} - \min\{i_{tot}(r)\}|_{r\in\{doped\ region\}}}{2} \leq$ $\quad (2)$ $$\text{average}\{i_{tot}(r)|_{r\in\{doped\ region\}}\} \times T_2$$

$$\text{wherein: } \Gamma_k = \sum\nolimits_{n=1}^{N}\left\{2\pi\int_{r=0}^{\infty} i_k(r)\times\rho_n(r)rdr\right\},$$

$\rho_n(r)$ being a rare-earth or transition metal dopant concentration distribution of the n-th doped ring;

$$i_{tot}(r)=\Sigma_{k=1}^{K}i_k(r);$$

K is the total number of modes;

N is a total number of doped rings;

$T_1$ being a first pre-determined threshold; and $T_2$ being a second pre-determined threshold.

3. The optical fiber of claim 2, wherein the first pre-determined threshold is 0.025, and the second pre-determined threshold is 0.1.

4. The optical fiber of claim 1, wherein the radius of the core region is between 18 and 22 μm.

5. The optical fiber of claim 1, wherein the cladding region has an external radius between 115 and 135 μm.

6. The optical fiber of claim 1, wherein the at least one core layer comprises a single core layer having a corresponding refractive index lower than the refractive index of the central core.

7. The optical fiber of claim 1, wherein the at least two doped rings are doped with bismuth or one or more dopants selected from a group consisting of erbium, ytterbium, neodymium, thulium, praseodymium, and holmium.

8. An optical fiber, comprising:

a core region for guiding a propagation of a multimode optical signal, the core region defining a circular cross-section, the core region comprising:

a central core having a first refractive index;

at least one core layer laterally surrounding the central core, each of the at least one core layer having:

a corresponding internal radius, an internal radius of an innermost core layer corresponding to a radius of the central core;

a corresponding external radius, an external radius of an outermost core layer corresponding to a radius of the core region; and a corresponding refractive index below the first refractive index, the refractive indexes of the at least one core layer decreasing as the internal radius of the at least one core layer increases to form a step refractive index profile;

a cladding region laterally surrounding the core region, the cladding region having a second refractive index below any refractive index of the at least one core layer; and at least two doped rings, each of the at least two doped rings having a corresponding rare-earth or transition metal dopant concentration, wherein the at least two doped rings are doped with erbium ions and ytterbium ions, a concentration of the ytterbium ions in the at least two doped rings being between 10 and 30 times higher than a concentration of the erbium ions therein.

9. An optical fiber, comprising:

a core region for guiding a propagation of a multimode optical signal, the core region defining a circular cross-section, the core region comprising:

a central core having a first refractive index;

at least one core layer laterally surrounding the central core, each of the at least one core layer having:

a corresponding internal radius, an internal radius of an innermost core layer corresponding to a radius of the central core;

a corresponding external radius, an external radius of an outermost core layer corresponding to a radius of the core region; and a corresponding refractive index below the first refractive index, the refractive indexes of the at least one core layer decreasing as the internal radius of the at least one core layer increases to form a step refractive index profile;

a cladding region laterally surrounding the core region, the cladding region having a second refractive index below any refractive index of the at least one core layer; and at least two doped rings, each of the at least two doped rings having a corresponding rare- earth or transition metal dopant concentration, wherein the at least two doped rings comprise:

a first doped ring having erbium ion concentration of between $1.3\times10^{25}$ m$^{-3}$ and $1.7\times10^{25}$ m$^{-3}$; and a second doped ring having erbium ion concentration of between $1.8\times10^{25}$ m$^{-3}$ and $2.2\times10^{25}$ m$^{-3}$.

10. The optical fiber of claim 1, further comprising a polymer layer surrounding the cladding region, the polymer layer having a refractive index below the refractive index of the cladding region.

11. The optical fiber of claim 1, wherein the optical fiber is a multimode optical fiber such that the multimode optical signal propagating therein comprises six linearly polarized modes: $LP_{01}$, $LP_{11a}$, $LP_{11b}$, $LP_{02}$, $LP_{21a}$ and $LP_{21b}$.

12. The optical fiber of claim 1, wherein the at least two doped rings are located in the core region.

13. An optical amplifier for amplifying a multimode optical signal, the optical amplifier comprising:

an input for receiving the multimode optical signal;

a pump source configured for generating an optical pump signal;

a signal combiner configured to combine the received multimode optical signal with the optical pump signal; and a span of the optical fiber of claim 1, the signal combiner being further configured to inject the combined signal at an input of the span of optical fiber, the span extending between the signal combiner and an output of the optical amplifier.

14. The optical amplifier of claim 13, wherein a length of the of optical fiber is between 2 meters and 45 meters.

15. The optical amplifier of claim 13, wherein the optical pump signal has a wavelength of between 970 nm and 990 nm and an optical power of about 20 W.

16. The optical amplifier of claim 13, further comprising one or more isolator disposed at the input and/or at an output of the optical amplifier.

17. The optical amplifier of claim 13, wherein the pump source is a first pump source, the signal combiner is a first signal combiner, the optical pump signal is a first optical pump signal, and the optical fiber is a first optical fiber defining a first span, the optical amplifier further comprising:

a second pump source configured for generating a second optical pump signal;

a second signal combiner configured to receive the multimode optical signal at an output of the first span and combine said multimode optical signal with the second optical pump signal;

a second span of the optical fiber, the second signal combiner being further configured to inject the combined signal at an input of the second span, the second span extending between the signal combiner and the output of the optical amplifier.

18. The optical amplifier of claim 17, further comprising a multimode variable optical attenuator between the output of the first span of optical fiber and the second signal combiner.

19. The optical amplifier of claim 17, further comprising a signal filtering device between the output of the first span of optical fiber and the second signal combiner.

* * * * *